Nov. 25, 1958 A. B. WELCH 2,862,142
DEFLECTION SYSTEM FOR COLOR TELEVISION
Filed Aug. 29, 1955
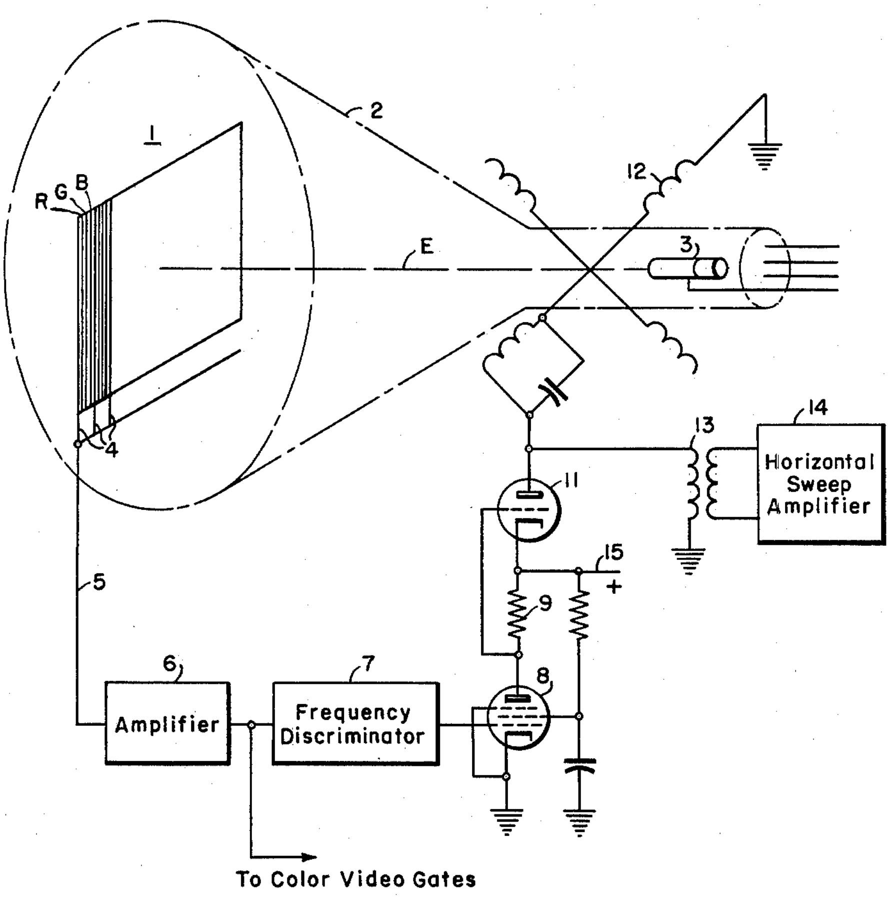
WITNESSES
Edwin E. Bassler
John J. Callahan
INVENTOR
Albert B. Welch
BY
F. E. Browder
ATTORNEY

1

2,862,142

DEFLECTION SYSTEM FOR COLOR TELEVISION

Albert B. Welch, East Meadow, N. Y., assignor to Westinghouse Electric Corporation, East Pittsburgh, Pa., a corporation of Pennsylvania Application August 29, 1955, Serial No. 531,166

5 Claims. (Cl. 315—21)

My invention relates to television picture receivers and, in particular, relates to an improved system for deflecting the electron beam in the picture-reproducing tube of color television receivers in which the scanning beam moves transversely across parallel strips of phosphors luminescing respectively on the three primary colors. P. K. Weimer's U. S. Patent 2,545,325 shows and describes the operation of one picture tube of this type.

In picture receivers of the type just mentioned, three signals corresponding respectively to the intensity of the three primary colors in the view being transmitted are produced in the receiver circuits, and are successively switched onto the control electrode of the cathode ray tube to control the intensity of the electron beam as it moves across the phosphor strip on the output screen to successively impinge on and render luminous the strips of the different colors. That is to say, a signal representing the intensity of, let us say, the blue light at a small area of the picture is switched onto the control electrode of the picture-receiving tube when its electron beam is incident on a strip of blue-emitting phosphor; a signal corresponding to the green light at that area is switched onto the control electrode when the electron beam has moved into incidence with a strip of green-emitting phosphor; and so on. In this way, the intensities of the primary colors in the picture being transmitted are reproduced point by point on the receiving screen.

It will be readily apparent that such an arrangement requires accurate synhcronization of the switching operations with the movement of the scanning beam from strip to strip. To effect this switching, the phosphor strips are divided into groups of three, a blue, a green, and a red strip, and the successive groups separated by a narrow strip of conductive material, these narrow strips being connected together at the ends to an outgoing bus. When the electron beam, moving across the screen, leaves one group and enters another group of phosphors, it strikes the intervening narrow conductor and sends a pulse of voltage through the latter to the switching or "gating" tube which is arranged in a way too well known to require detailed description, to connect first the blue, then the green, and then the red picture signal in the receiver to the control electrode of the picture-reproducing tube. Each signal is, of course, intended to be switched on for a time equal to that required by the electron beam to move across one phosphor strip.

The foregoing will perhaps be clearer upon reference to the drawings herein illustrating diagrammatically the phosphor strips R, G, B, the electron beam E which is swept across them in scanning, the narrow conducting strips 4 and the control circuits by which the color signals are switched on and off.

The pulse resulting from incidence of the electron beam on the narrow conducting strips 4 is of relatively low energy and has to act through an amplifier to perform its switching operations. If all of the phosphor strips could be made of absolutely uniform width and spacing, and the scanning motion of the electron beam absolutely uniform, the pulses on the input of this amplifier would occur at constant frequency, and an amplifier with a narrow pass band could be employed. Such an amplifier would have the advantages of (1) a high signal-to-noise ratio and (2) high gain per stage. However, as a practical matter, the spacing and width of the strips have some variation and with prior art circuitry the current through the horizontal sweep coils does not produce high uniformity of scanning motion in the electron beam trace.

One object of my invention is to provide an improved scanning circuit which shall maintain a high degree of constancy in the frequency of the pulses impressed on the input of the amplifier of the above-described color signal gating system.

Another object is to provide an arrangement for automatically varying the horizontal sweep coil current to maintain substantial constancy of frequency in the pulses impressed on the gating-control amplifier.

Another object is to provide circuitry which shall make possible the use of a narrow pass band channel for the pulses controlling the gating of color signals in a color television receiver of the above-described type.

Still another object is to provide a new and improved color television receiver.

Other objects of my invention will become apparent upon reading the following description, taken in connection with the drawing, in which the single figure is a diagrammatic showing of a color television receiving picture tube and circuit which embodies the principles of my invention.

Referring to the drawing in detail, a screen 1, which may be the glass end of a cathode ray tube 2, supports narrow parallel strips R, G and B of electron phosphor which respectively emit red, green and blue light upon incidence of an electron beam E projected by an electron gun 3, of the type well known in the art, to scan the strips R, G and B by transverse movements. The phosphor strips R, G, B comprise groups of three, separated from each other by fine conducting strips or wires 4, which are all connected together to a common bus or in-lead 5 sealed through the walls of tube 2. As the beam E moves from the blue strip B of one group to the red strip R of the next group, it strikes one of the conducting wires 4 and produces a voltage pulse which is transmitted through lead 5 to an amplifier 6. One channel from the output of amplifier 6 impresses the amplified pulse on the color video gating control which is of conventional type and switches the red picture signal, then the green picture signal, and then the blue picture signal onto the control electrode of the cathode ray tube 2. A second channel from the output of amplifier 6 impresses the amplifier pulses on a frequency discriminator 7 which may be of any conventional type capable of impressing on the input to an amplifier 8 a voltage which is more positive when the frequency of the pulses is below a normal value. The cathode of damper tube 8 is grounded and its anode is connected through a resistor 9 to the cathode of a damper tube 11 which has its anode connected to the ungrounded terminal of the horizontal deflection coils 12 of cathode ray tube 2. The ungrounded terminal of coils 12 is also connected to the ungrounded end of a secondary winding 13 having a primary which is energized from a conventional horizontal sweep amplifier 14. The polarity of amplifier 14 is such that the plate of tube 11 is positive during the active part of the sweep. The positive terminal 15 of a voltage source (not shown) having its negative terminal grounded is connected to the cathode of damper tube 11. The output of the horizontal sweep amplifier 14 is made greater than necessary to sweep the full width of the screen 1 and the voltage impressed at 15 is less positive than the voltage at the ungrounded terminal of deflection coil 12 during the active portion of the scanning sweep. Since the coil 12 is highly inductive, a linearly rising saw-tooth current in coil 12 generates a substantially constant positive voltage at said ungrounded terminal.

Since the other portions of the color TV receiver embodying cathode ray tube 2 are well known in the art, they will not be described in detail here.

The mode of operation of the foregoing arrangement is substantially as follows. The amplifier 6, which has a relatively narrow pass band, is designed to amplify efficiently pulses of periodic time equal to the period of the active stroke divided by the number of groups on screen 1. If, at any instant of the scanning stroke the frequency of the pulses impressed on amplifier 6 falls below this value, the frequency discriminator 7 impresses a more positive voltage on the grid of amplifier 8, thus decreasing the current diverted by damper tube 11 from deflecting coil 12, whereupon the latter moves the scanning beam E more rapidly and raises the scanning frequency. On the other hand, if the pulse frequency generated in wires 4 is above the center frequency of the pass band of amplifier 6, the reverse action occurs and decreases the scanning frequency. The amplifier 6 may thus be of a narrow pass band type in respect to frequency, and so have the advantages already pointed out for such amplifiers. In addition, improved linearity is attained in the horizontal scanning.

In the application of my improved scanning circuit to a television system the video modulation of the electron beam may introduce errors in the pulses obtained from the conducting wires 4. These errors can be minimized through the use of an amplitude limiter located between the amplifier 6 and the discriminator 7.

While one embodiment of the invention has been described for the purpose of illustration, it will be obvious to those skilled in the art that it is not so limited, but is susceptible of various changes and modifications without departing from the spirit and scope theerof.

I claim as my invention:

1. In a color television picture receiver of the type employing a cathode ray tube having an output screen supporting parallel groups of color-emitting strips separated by conducting strips having a common lead to a control amplifier, a color video gating circuit in the output of said control amplifier and, in addition, a frequency discriminator which impresses voltage on a damper tube which is connected in shunt with deflection coils of said cathode ray tube, means for producing saw-tooth current waves in said deflection coils, and means for applying signals from said conducting strips on said frequency discriminator.

2. A deflection coil circuit for cathode ray tubes in which a scanning beam is deflected by a coil in a direction transverse to conductive strips having a common outlead, a narrow frequency band amplifier having its input connected to said outlead, a frequency discriminator having its input connected to the output of said amplifier, a damper tube connected in shunt relation to said coil and having a control circuit connected in the output circuit of said frequency discriminator with such polarity that lower frequencies impressed on said frequency discriminator cause an increase of current in said coil.

3. In a color television picture receiver, a cathode ray tube having an output screen comprising groups of phosphor strips, successive groups being separated by strips of conductive material which have a common outlead, means for scanning said strips transversely with a cathode ray beam, a narrow frequency band amplifier having its input connected to said outlead and a frequency discriminator in its output circuit, a deflection coil for said cathode ray beam, means for supplying saw-tooth current to said coil and a damper tube connected in shunt relation to said coil and having the output voltage of said frequency discriminator connected to increase current flow in said coil when lower frequencies are impressed on said frequency discriminator.

4. A television image reproducing system comprising, an image screen having a plurality of substantially parallel strip-like sections, means for generating an electron beam, raster forming means for scanning said beam transversely of said strips including beam deflection means and a scanning signal generator coupled to said beam deflection means to apply scanning signals thereto, means for developing a train of pulses in response to traversal of said strips by said beam, frequency discriminator means coupled to said pulse developing means for producing a potential corresponding to the time intervals between successive pulses of said train, and control circuit means connected between said frequency discriminator means and said raster forming means to modify said scanning signals in response to the magnitude of said potential.

5. A control circuit for an electron beam deflection system having a deflection wave generator and a deflection yoke winding comprising, means for developing a train of pulses having inter-pulse time intervals corresponding to successive increments of electron beam deflection, frequency discriminator means for producing an output potential corresponding to the duration of said time intervals, and an amplifier circuit coupled between said discriminator means and said deflection system so as to regulate the form of the deflection wave applied to said yoke winding in accordance with changes in the discriminator output potential.

References Cited in the file of this patent

UNITED STATES PATENTS

| | | |
|---|---|---|
| 2,523,162 | Sunstein | Sept. 19, 1950 |
| 2,634,326 | Goodrich | Apr. 7, 1953 |
| 2,695,975 | Sanford | Nov. 30, 1954 |
| 2,728,026 | Overbeek | Dec. 20, 1955 |
| 2,728,875 | Kihn | Dec. 27, 1955 |
| 2,744,952 | Lawrence | May 8, 1956 |

Notice of Adverse Decision in Interference

In Interference No. 91,267 involving Patent No. 2,862,142, A. B. Welch, Deflection system for color television, final judgment adverse to the patentee was rendered March 3, 1961, as to claim 4.

[*Official Gazette May 2, 1961.*]

Notice of Adverse Decision in Interference

In Interference No. 91,267 involving Patent No. 2,862,142, A. B. Welch, Deflection system for color television, final judgment adverse to the patentee was rendered March 3, 1961, as to claim 4.

[*Official Gazette May 2, 1961.*]